(12) United States Patent
Hirth et al.

(10) Patent No.: US 9,225,107 B2
(45) Date of Patent: Dec. 29, 2015

(54) ELECTRICAL CONNECTION HAVING A BUSHING OR A CONDUCTOR CONFIGURED TO ABSORB LIMITED TORQUE

(71) Applicant: EMITEC GESELLSCHAFT FUER EMISSIONSTECHNOLOGIE MBH, Lohmar (DE)

(72) Inventors: Peter Hirth, Roesrath (DE); Thomas Haerig, Neunkirchen-Seelscheid (DE); Ferdi Kurth, Mechernich (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/492,258

(22) Filed: Sep. 22, 2014

(65) Prior Publication Data

US 2015/0011115 A1 Jan. 8, 2015

Related U.S. Application Data

(63) Continuation of application No. PCT/EP2013/054806, filed on Mar. 11, 2013.

(30) Foreign Application Priority Data

Mar. 21, 2012 (DE) .......................... 10 2012 005 786

(51) Int. Cl.
*H01R 13/62* (2006.01)
*H01R 13/58* (2006.01)
(Continued)

(52) U.S. Cl.
CPC ................ *H01R 13/58* (2013.01); *F01N 3/027* (2013.01); *F01N 3/2026* (2013.01); *H01R 4/302* (2013.01);
(Continued)

(58) Field of Classification Search
CPC ..... H01R 13/533; H01R 13/633; H01R 13/635
USPC .................................... 439/352–358, 474–475
See application file for complete search history.

(56) References Cited

U.S. PATENT DOCUMENTS 4,046,052 A * 9/1977 Nordstrom ......................... 411/1
4,362,351 A * 12/1982 Wible ............................ 439/738
(Continued)

FOREIGN PATENT DOCUMENTS

DE 3308332 A1 9/1984
DE 9320985 U1 9/1995
(Continued)

*Primary Examiner* — Chandrika Prasad
(74) *Attorney, Agent, or Firm* — Laurence Greenberg; Werner Stemer; Ralph Locher

(57) ABSTRACT

An electrical connection for an electrical component or electrically heatable honeycomb body, in an exhaust system of an internal combustion engine includes an electrical conductor passing through a metallic jacket of the exhaust system, a bushing and an insulating layer and having an outer connection section with circular cross section. The connection section has a contact surface for connection to a supply line connection piece. The bushing and/or electrical conductor near the bushing can absorb torques up to 3.6, 4.5 or 7 Nm per $cm^2$ of contact surface acting on the connection section and/or an internal or external thread in circumferential direction, by shaping the electrical conductor near the bushing or using structures and/or changes to the cross section or a formlocking construction of the electrical conductor and the bushing. Damage to electrical exhaust components due to external torques, disassembly and maintenance can thus be avoided.

22 Claims, 4 Drawing Sheets

(51) Int. Cl.
- *F01N 3/20* (2006.01)
- *F01N 3/027* (2006.01)
- *H01R 4/30* (2006.01)
- *H05B 3/42* (2006.01)
- *H01R 39/60* (2006.01)
- *H01R 11/28* (2006.01)
- *B01J 35/04* (2006.01)

(52) U.S. Cl.
CPC .......... *H01R 39/60* (2013.01); *H05B 3/42* (2013.01); *B01J 35/04* (2013.01); *H01R 11/28* (2013.01); *H05B 2203/016* (2013.01); *H05B 2203/024* (2013.01); *Y02T 10/26* (2013.01)

(56) References Cited

U.S. PATENT DOCUMENTS

| | | | |
|---|---|---|---|
| 4,904,198 A * | 2/1990 | Begitschke et al. | 439/281 |
| 5,041,004 A * | 8/1991 | Waldorf | 439/306 |
| 5,768,889 A | 6/1998 | Maus et al. | |
| 5,887,427 A | 3/1999 | Maus et al. | |
| 6,031,213 A | 2/2000 | Hashimoto et al. | |
| 6,082,941 A * | 7/2000 | Dupont et al. | 411/7 |
| 6,109,946 A | 8/2000 | Hotz et al. | |
| 6,349,466 B1 * | 2/2002 | Redler et al. | 29/825 |
| 6,802,680 B1 * | 10/2004 | Rubenstein | 411/7 |
| 7,537,494 B1 * | 5/2009 | Umlauf | 439/798 |
| 7,682,208 B2 * | 3/2010 | Bankstahl | 439/889 |
| 7,780,386 B2 * | 8/2010 | Lau et al. | 411/7 |
| 2004/0062622 A1 | 4/2004 | Schaty | |
| 2006/0160434 A1 * | 7/2006 | Pettersen | 439/801 |

FOREIGN PATENT DOCUMENTS

| | | |
|---|---|---|
| DE | 19520758 A1 | 12/1996 |
| DE | 19627840 A1 | 1/1998 |
| DE | 202004015549 U1 | 12/2004 |
| DE | 69533609 T2 | 10/2005 |
| EP | 0716558 A2 | 6/1996 |
| EP | 0783621 B1 | 3/1998 |
| EP | 1638171 A2 | 3/2006 |
| WO | 9747057 A1 | 12/1997 |

* cited by examiner

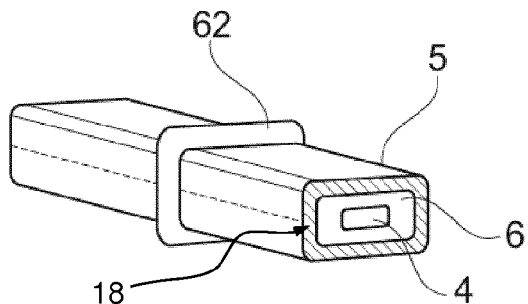
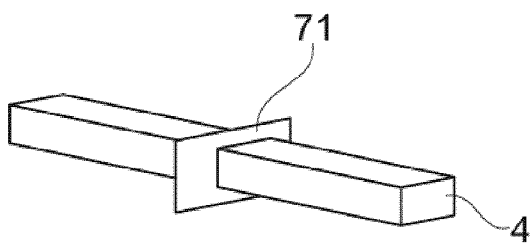
Fig. 6　　　　Fig. 7
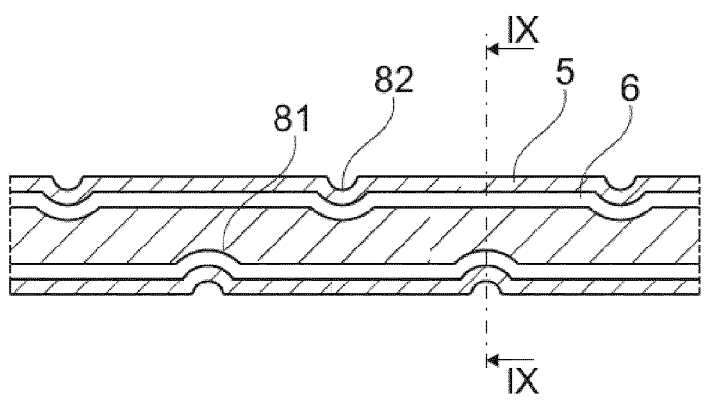
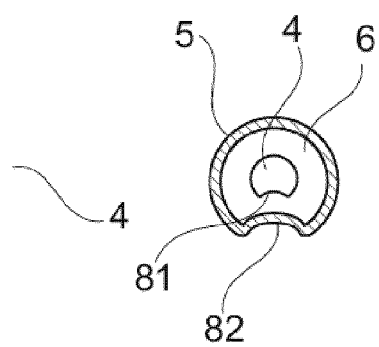
Fig. 8　　　　Fig. 9
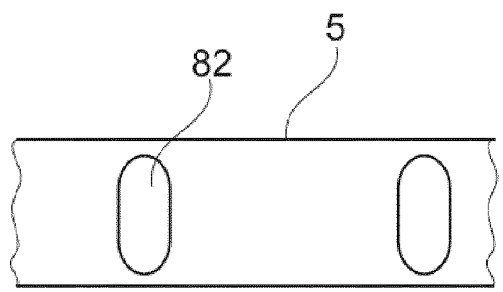
Fig. 10

ELECTRICAL CONNECTION HAVING A BUSHING OR A CONDUCTOR CONFIGURED TO ABSORB LIMITED TORQUE

CROSS-REFERENCE TO RELATED APPLICATION

This is a continuation, under 35 U.S.C. §120, of copending International Application No. PCT/EP2013/054806, filed Mar. 11, 2013, which designated the United States; this application also claims the priority, under 35 U.S.C. §119, of German Patent Application DE 10 2012 005 786.5, filed Mar. 21, 2012; the prior applications are herewith incorporated by reference in their entirety.

BACKGROUND OF THE INVENTION

Field of the Invention

The present invention relates to the field of electrical components in an exhaust-gas system of an internal combustion engine, in particular of a motor vehicle. Modern exhaust-gas purification systems also often contain electrical components having feed lines which need to be passed in an electrically insulated fashion from the outside into the exhaust-gas system. In particular, in the case of components which require relatively high currents, for example electrically heatable honeycomb bodies or the like, a relatively bulky electrical connection is required in order to be able to pass through sufficiently high currents.

A typical electrically heatable honeycomb body is known from European Patent EP 0 783 621 B1, corresponding to U.S. Pat. No, 5,768,889. Such a honeycomb body has at least one electrical connection, which until now has been substantially rotationally symmetrical.

International Publication No. WO 97/47057 has also disclosed the specific construction of such a connection including an electrical conductor and a bushing, from which the electrical conductor is electrically insulated by using an insulating layer. The electrical conductor has an outer connecting section with a contact area for connection to a connection piece of a feed line wherein, in the described case, the connecting section is configured so as to be slightly conical.

The present invention is based on that prior art. Electrical components in an exhaust-gas system are often subjected to high temperatures during operation, which also applies to the electrical connections because electrical conductivity is typically associated with good thermal conductivity, with the result that even those parts of an electrical connection which are located outside a metallic jacket can become very hot. That can result in oxidation and/or corrosion of contact areas or threads. Even when a connection piece is fastened to a connecting section, in particular if the two have a conical configuration, even in the new state certain forces need to be exerted on the electrical connection. If a coaxial thread is disposed on the electrical connection on the inside or on the outside, when a screw or nut is tightened torques are necessarily exerted on the electrical connection. It has proven to be the case there that a rotationally symmetrical configuration in which an electrical conductor is typically surrounded by a ceramic insulating layer, in particular compressed ceramic powder, can be damaged or even detached by torques acting on the electrical conductor. Typically, the electrical conductor is also electrically conductively connected, in particular welded, brazed or soldered, to an electrical component in the interior of the exhaust-gas system as well, in which case neither that joint nor the electrical component can or should withstand high torques.

Therefore, it has been conventional until now to limit the torques to be applied during fitting, but that limits the surface pressure, for example, in the case of conically constructed connecting sections. Even more problematic is the situation in the case of subsequent maintenance or other types of repair work in which the electrical connection needs to be detached. The torques required therefor can be considerably higher than those required during fitting, with the result that the electrical component or the bushing or the electrical insulation can be damaged.

SUMMARY OF THE INVENTION

It is accordingly an object of the invention to provide an electrical connection secured against rotation, in particular for an electrically heatable honeycomb body, which overcomes the hereinafore-mentioned disadvantages of the heretofore-known devices of this general type, which has a simple construction that avoids or reduces the described problems and which, in particular, also allows sensitive components which cannot withstand high torques to be supplied with high electrical currents in the interior of an exhaust-gas system.

The embodiments according to the invention are based on the (same) concept that necessary torques during fitting, dismantling and operation can be exerted externally on the electrical connection without the bushing or the electrical component in the interior being damaged in the process.

With the foregoing and other objects in view there is provided, in accordance with the invention, an electrical connection for an electrical component in an exhaust-gas system of an internal combustion engine, in particular an electrically heatable honeycomb body, wherein the exhaust-gas system has a metallic jacket, through which an electrical conductor is passed through an insulating layer in electrically insulated fashion by using a bushing or feed-through with a geometric central axis, and wherein the electrical conductor has an outer connecting section which is circular in cross section and has a contact area for connection to a connection piece of a feed line and/or an inner or outer thread which is coaxial to the central axis of the bushing. The bushing in this case is configured in such a way that it can absorb torques of up to 8 Nm (newton meters), preferably of up to 10 Nm, in particular up to 15 Nm, acting on the connecting section and/or the inner or outer thread in the circumferential direction thereof.

In accordance with a further aspect of the invention, the same object is achieved, but in dependence on the size of the contact area, i.e. in dependence on the current intensity typically to be transmitted. This takes into account the fact that there are smaller and larger electrical components with lower or higher power consumption, so that the forces to be absorbed are set in relation to the contact area.

With the objects of the invention in view, there is also provided an electrical connection for an electrical component in an exhaust-gas system of an internal combustion engine, in particular an electrically heatable honeycomb body, wherein the exhaust-gas system has a metallic jacket, through which an electrical conductor is passed through an insulating layer in electrically insulated fashion by using a bushing or feed-through, and wherein the electrical conductor has an outer connecting section which is circular in cross section and has a contact area for connection to a connection piece of a feed line, wherein the bushing is configured in such a way that it can absorb torques of up to 3.6 Nm (newton meters) per $cm^2$ (centimeters squared) of contact area, preferably of up to 4.5

Nm/cm$^2$, in particular up to 7 Nm/cm$^2$, acting on the connecting section and/or the inner or outer thread in the circumferential direction thereof.

In accordance with the invention, the bushing or the electrical conductor, in particular in the region of the bushing, is configured in such a way that higher torques can be absorbed than were previously typically permitted. Damage to the bushing or the electrical component can thus be prevented even when relatively high torques are applied.

In accordance with another preferred feature of the electrical connection of the invention, the electrical conductor thereof has securing elements for securing against rotation in the region of the bushing. In the case of a rotationally symmetrical configuration, when high torques are applied to the electrical conductor there is primarily the risk that the electrical conductor will rotate within the bushing in the electrical insulating layer, as result of which the torque can be transmitted to the electrical component in the interior and can cause damage there. It may therefore already be sufficient if the electrical conductor is provided with devices for securing against rotation in the region of the bushing.

In accordance with a further feature of the electrical connection of the invention, the electrical conductor has an outer cross section deviating from the circular shape in the region of the bushing, in particular an oval or polygonal cross-sectional shape. In this embodiment, much higher forces are required for a rotation because at least some of the insulating layer would need to be carried along with the rotation. Even an outer cross section of the electrical conductor which deviates from the circular shape without any other changes to the bushing achieves a considerable effect. This is naturally increased when the bushing itself also internally has a corresponding cross-sectional shape deviating from the circular shape.

In accordance with an added feature of the electrical connection of the invention, which makes it possible to absorb considerable torques, is the configuration of the electrical conductor in such a way that it is independent of its general cross-sectional shape with an externally fitted structure, in particular a structure extending in the longitudinal direction of the electrical conductor and/or at an angle thereto, in particular grooves, channels, ribs and/or elevations. In this way, the adhesion in the insulating layer is considerably increased, in particular when elevations, for example ribs, protrude into the insulating layer.

In accordance with an additional particularly preferred feature of the electrical connection of the invention, the bushing, in terms of its shape and/or inner surface structure, acts as mating piece to the corresponding region of the electrical conductor and is electrically insulated therefrom by a ceramic insulating layer, in particular compressed ceramic powder. In this configuration, there is a type of form-locking connection which is transmitted through the compressed ceramic powder and which virtually excludes rotation even in the case of a high torque.

In accordance with yet another feature of the electrical connection of the invention, independently of the cross-sectional shapes of the conductor and the bushing, systems which interact in accordance with the tongue and groove principle can also be used and thus the electrical conductor can have at least one structure in the longitudinal direction which interacts with the bushing in accordance with the tongue and groove principle in the region of the bushing.

In accordance with yet a further feature of the electrical connection of the invention, in addition to the previously described properties, the electrical conductor also needs to be passed to the outside in a gas-tight manner and therefore the gas-seal-tightness or gas-tightness can be improved by virtue of the electrical conductor having at least one structure which extends in the circumferential direction and which preferably interacts with a corresponding mating structure of the bushing in the region of the bushing. This configuration results not only in a type of labyrinth seal, but also increases the size of the friction areas between the electrical conductor and the insulating layer, as result of which, at the same time, the torque to be absorbed is increased. One or more such structures in succession therefore at the same time increase the gas-tightness of the bushing and the antirotational protection.

In accordance with yet an added feature of the electrical connection of the invention, the described embodiments are particularly suitable for an electrical connection including a connecting section with a conical configuration which can be plugged together with a correspondingly configured connection piece in self-locking fashion. With respect to the configuration of such self-locking connections, reference is made to the full scope of the embodiments of International Publication No. WO 97/47057 in this regard which can also be used for explanatory purposes herein.

In accordance with yet an additional feature of the electrical connection of the invention, in order to press such a connecting section together with the connection piece, the electrical conductor can have an outer thread above the conical connecting section, with it being possible for a nut for tightening the connection piece to be screwed onto the outer thread.

The invention makes it possible to apply higher torques and therefore larger surface pressures given the same conical shape of the connecting section in comparison with conventional systems and primarily also enables dismantling even in the case of an oxidized thread or connecting section, without the electrical component being damaged in the process.

In accordance with again another feature of the electrical connection of the invention, the same applies if the electrical conductor has an inner thread onto which a screw with a head for tightening the connection piece can be screwed.

In accordance with a concomitant feature of the electrical connection of the invention, by way of supplement to or replacement for the previously described embodiments of the invention, an opposing holding device can be provided on the electrical conductor (above the bushing). The opposing holding device helps to prevent rotation of the electrical conductor in the bushing by providing an opposing hold with a suitable tool (application of a countertorque). In the simplest case, this may be a section of the electrical conductor which has multiple edges, preferably six edges, in cross section, on which section a wrench or a similar tool can act for providing the opposing hold. In this case, providing an opposing hold device means the application of a second torque which counteracts a torque acting on the electrical conductor.

The invention can be used, in particular, in a motor vehicle including an internal combustion engine and an electrically heatable honeycomb body integrated in the exhaust-gas system.

Other features which are considered as characteristic for the invention are set forth in the appended claims. Advantageous configurations are specified in the dependent claims, wherein these configurations can be used individually or in technically expedient combinations. Furthermore, the features of the claims can also be combined with features of the description and define further embodiments of the invention.

Although the invention is illustrated and described herein as embodied in an electrical connection secured against rotation, in particular for an electrically heatable honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is a perspective view of an exemplary embodiment of a bushing with a circumferential structure;

FIG. 7 is a perspective view of an exemplary embodiment of an electrical conductor with a circumferential structure matching the bushing shown in FIG. 6;

FIG. 8 is a longitudinal-sectional view of a further exemplary embodiment of the invention in the region of the bushing;

FIG. 9 is a cross-sectional view taken along the line IX-IX of FIG. 8, in the direction of the arrows;

FIG. 10 is a fragmentary, plan view of part of a bushing as shown in FIG. 8.

DETAILED DESCRIPTION OF THE INVENTION

Figure 1:
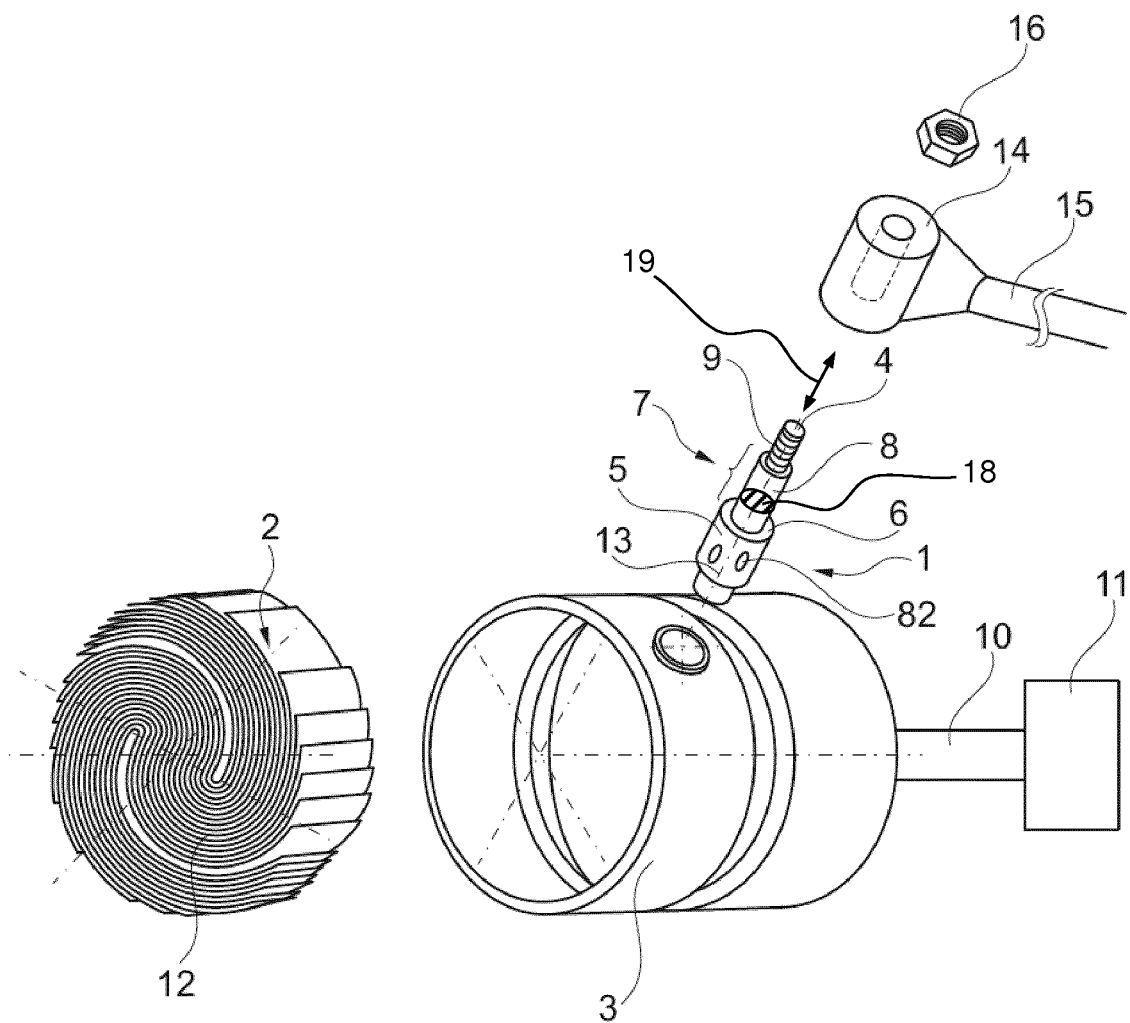
FIG. 1 is a diagrammatic, perspective view of an exhaust-gas system of an internal combustion engine including an electrical component and an electrical connection prior to assembly.

Referring now in detail to the figures of the drawings, which are diagrammatic, partially perspective and not necessarily true to scale, and first, particularly, to FIG. 1 thereof, there is seen an electrical connection 1 prior to installation in a jacket 3 of an exhaust-gas system 10 of an internal combustion engine 11 and prior to connection to an electrical component 2 to be disposed in the jacket 3. The electrical component 2 is preferably an electrically heatable honeycomb body 12, which is intended to be supplied with current through an electrical conductor 4 after installation of the electrical component. For this purpose, the electrical conductor 4 is passed through a bushing 5, from which it is electrically insulted by an insulating layer 6, and through the jacket 3. The electrical conductor 4 is connected to the electrical component 2 in the interior. Externally, it has a connecting section 7 which has a contact area 8 and, in this region (transversely to the longitudinal direction 19) it has a circular cross section 18. The connecting section 7 can preferably be shaped so as to be slightly conical, however, with the result that a connection piece 14 with a corresponding conical opening can be pushed onto the connecting section 7 in self-locking fashion. The contact-pressure forces in the region of the contact area 8 can be increased and set by tightening a nut 16 on an outer thread 9 or by tightening a non-illustrated screw in a non-illustrated inner thread in the electrical conductor 4. In this way, a feed line 15 can be securely connected to the electrical conductor 4, with the result that the electrical connection 1 can draw currents of 30 amperes or more, up to several hundred amperes. While, in accordance with the prior art, such an electrical connection has generally been constructed to be rotationally symmetrical about a geometric central axis 13, the electrical connection 1 according to the invention has a device 82 for increasing the torque which can be absorbed by the bushing 5. Specific possible embodiments for such a device for securing against rotation are illustrated by way of example in the following figures.

Figure 2:
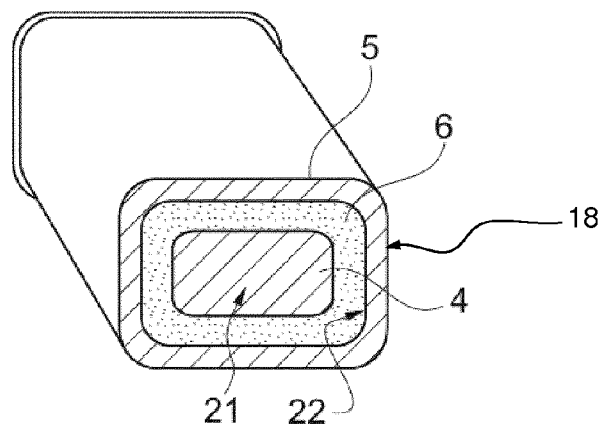
FIG. 2 is an enlarged, perspective view of a first exemplary embodiment of the invention with a non-circular cross section of the electrical conductor and bushing.

FIG. 2 shows the possibility of configuring the electrical conductor 4 with an outer cross section 21 which deviates from the circular shape in the region of the bushing 5, wherein preferably at the same time an inner cross section 22 of the bushing 5 also deviates correspondingly from the circular shape. The insulating layer 6, which preferably is formed of compressed ceramic powder, is virtually incompressible, with the result that, due to the shown formation of the electrical conductor 4 and the bushing 5, rotation of the electrical conductor 4 is practically ruled out even in the case of very high torques.

Figure 3:
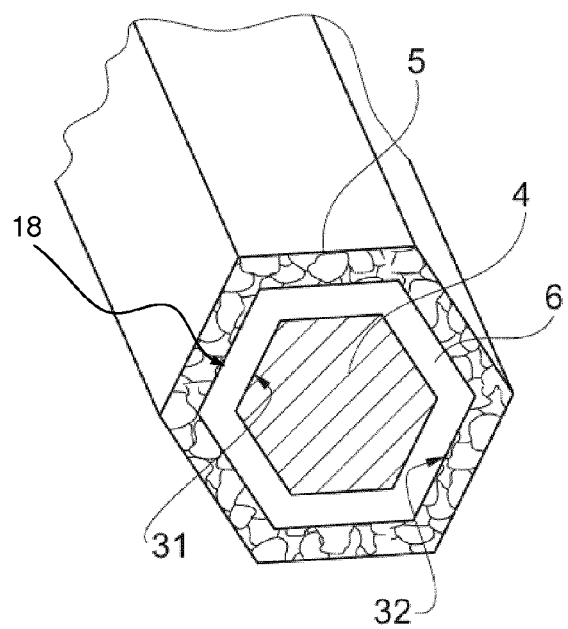
FIG. 3 is a fragmentary, perspective view of a second exemplary embodiment of the invention with a hexagonal cross section of the electrical conductor and bushing.

FIG. 3 shows an electrical conductor 4 with a hexagonal outer cross section 31 in the region of the bushing 5, wherein the bushing 5 has a correspondingly disposed hexagonal inner cross section 32. In turn, an insulating layer 6 is disposed between the two. This figure is exemplary of any type of polygonal cross sections 18 which all increase the protection against rotation.

Figure 4:
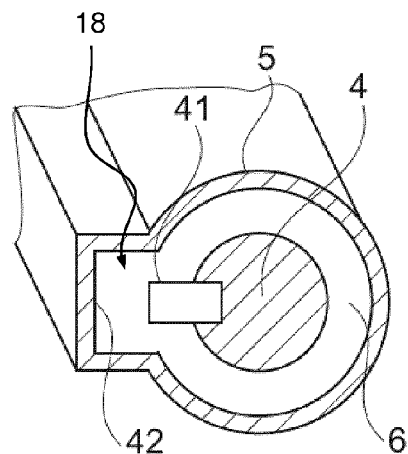
FIG. 4 is a fragmentary, perspective view of a further exemplary embodiment of the invention with an electrical conductor and bushing interacting in accordance with the principle of tongue and groove.

Another exemplary embodiment of the invention is illustrated in FIG. 4, which illustrates the interaction of a tongue 41 on the electrical conductor 4 with a groove 42 in the inner side of the bushing 5. One or more devices for securing against rotation extending in the longitudinal direction of the electrical conductor 4 and in the form of interacting groove 42 and tongue 41 likewise increase torques which can be absorbed by the bushing 5.

Figure 5:
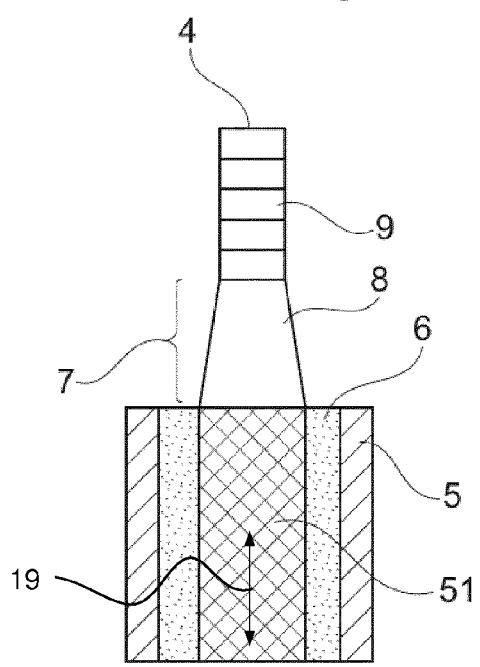
FIG. 5 is a partly sectional, elevational view of a further exemplary embodiment of the invention having an outer structure on the electrical conductor in the region of the bushing.

A further exemplary embodiment of the invention is illustrated in FIG. 5, which diagrammatically shows the electrical conductor 4 and its external properties in a longitudinal sectioned bushing 5. In accordance with the invention, the region of the electrical conductor 4 within the bushing 5 is provided with structures 51, in the present case with ribs crossing over one another and extending at an angle. This structure 51 effects substantially increased static friction between the electrical conductor 4 and the insulating layer 6, which means increased protection against rotation. FIG. 5 also shows the conical connecting section, which provides the contact area 8. An outer thread 9 is indicated at the end of the electrical conductor 4.

A further important exemplary embodiment of the invention is illustrated in FIGS. 6 and 7, wherein the precise illustrated cross-sectional shape of the parts is not absolutely necessary. FIG. 6 shows a bushing, in the present case with an approximately rectangular cross section 18 having a circumferential hollow structure 62, at least on the inner side, although it is also visible on the outside in the present case.

FIG. 7 shows a correspondingly configured electrical conductor 4 for the shape of the bushing 5 illustrated in FIG. 6. This electrical conductor 4 has an outwardly circumferential curvature 71 which can interact with the inwardly circumferential hollow structure 62. In addition to the protection against rotation already provided by the cross-sectional shape, even in the case of round cross-sectional shapes the interaction of the outwardly circumferential curvature 71 and the inwardly circumferential hollow structure 62 would effect additional protection against rotation by increasing the friction with the insulating layer 6. However, this means that the gas-tightness in the bushing 5 is increased because one or possibly even several successive circumferential curvatures or hollow structures form a type of labyrinth seal and result in additional compression of the insulating layer 6, which are both advantageous with respect to the gas-tightness.

FIGS. 8, 9 and 10 show a further exemplary embodiment of the invention, in which an electrical conductor 4 with an outer cross section which is circular per se and a bushing 5 with a likewise circular inner cross section are connected to one another in a virtually form-locking manner at several points by virtue of dents 82 in the bushing 5 and correspondingly disposed depressions 81 in the electrical conductor 4 through the insulating layer. Such dents 82 and depressions 81 can be fitted retrospectively from the outside on already prefabricated bushings 5 which are constructed to be rotationally symmetrical and have an electrical conductor 4, in order to increase the protection against rotation in a simple manner.

FIG. 8 shows a diagrammatic, longitudinal section through such a configuration, FIG. 9 shows a diagrammatic cross section along a line IX-IX through FIG. 8, and FIG. 10 shows a view from the outside of the bushing 5 in the region of the dents 82.

Figure 11:
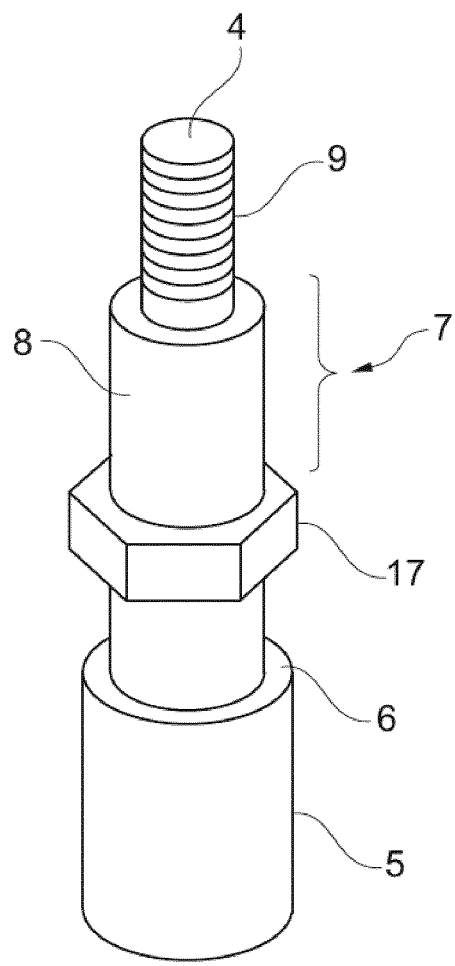
FIG. 11 is a perspective view of an electrical connection including an additional opposing holding device.

FIG. 11 shows a further configuration according to the invention for preventing rotation of the electrical conductor 4 and/or the insulation 6 in the bushing 5. An opposing holding device 17, in this case in the form of a hexagonal section of the electrical conductor 4, preferably a welded-on nut, permits the use of a wrench to absorb torques which counteract a torque acting on the connecting section 7 or the inner or outer thread 9. Such an opposing holding device 17 can preferably have larger dimensions in diameter than the electrical conductor and can form a type of collar with a spacing from the bushing 5 which is necessary for the electrical insulation. During operation, this assists the dissipation of heat out of the electrical conductor and therefore also further reduces the temperature of the contact area 8 in the connecting section 7.

The present invention makes electrical connections for electrical components in an exhaust-gas system less sensitive to externally applied torques, which simplifies fitting, maintenance and repair work. In addition, it is also possible to provide sensitive electrical components in an exhaust-gas system with an electrical connection or to configure electrical components to be less capable of withstanding torques which are transmitted from the outside inwards. This increases the structural possibilities for inexpensive electrical components, in particular electrically heatable honeycomb bodies in exhaust-gas purification systems.

The invention claimed is:

1. In an exhaust-gas system of an internal combustion engine having an electrical component and a metallic jacket, an electrical connection for the electrical component, the electrical connection comprising:
    a bushing having a geometric central axis;
    an electrical conductor passing through said metallic jacket and said bushing;
    an insulating layer electrically insulating said bushing and said electrical conductor;
    said electrical conductor having at least one outer connecting section with a circular cross section and a contact area for connection to a connection piece of a feed line or said electrical conductor having an inner or outer thread being coaxial to said central axis of said bushing; and
    at least said bushing or said electrical conductor being configured to absorb torques of up to 8 Nm (newton meters) acting at least on said connecting section or on said inner or outer thread in circumferential direction thereof.

2. The electrical connection according to claim 1, wherein said electrical conductor has securing elements for securing against rotation in vicinity of said bushing.

3. The electrical connection according to claim 1, wherein said electrical conductor has an outer cross section deviating from a circular shape in vicinity of said bushing.

4. The electrical connection according to claim 1, wherein said electrical conductor has an outer structure extending in a longitudinal direction of said electrical conductor or at an angle to said longitudinal direction in vicinity of said bushing.

5. The electrical connection according to claim 1, wherein said bushing has at least a shape or an inner surface structure acting as a mating piece to a corresponding region of said electrical conductor, said bushing is electrically insulated from said corresponding region by said insulating layer, and said insulating layer is ceramic.

6. The electrical connection according to claim 1, wherein said electrical conductor has at least one structure in a longitudinal direction interacting with said bushing as a tongue and groove in vicinity of said bushing.

7. The electrical connection according to claim 1, wherein said electrical conductor has at least one structure extending in a circumferential direction for increasing gas-tightness of said bushing in vicinity of said bushing.

8. The electrical connection according to claim 1, wherein said connecting section has a conical shape configured to be plugged together with a corresponding shape of the connection piece in a self-locking manner.

9. The electrical connection according to claim 8, wherein said outer thread of said electrical conductor is disposed above said conical connecting section and is configured to permit a nut to be screwed onto said outer thread to tighten the connection piece.

10. The electrical connection according to claim 8, wherein said electrical conductor has an inner thread configured to receive a screw for tightening the connection piece.

11. The electrical connection according to claim 1, wherein said electrical conductor has an opposing holding device configured to apply a counter torque.

12. In an exhaust-gas system of an internal combustion engine having an electrical component and a metallic jacket, an electrical connection for the electrical component, the electrical connection comprising:
    a bushing having a geometric central axis;
    an electrical conductor passing through said metallic jacket and said bushing;
    an insulating layer electrically insulating said bushing and said electrical conductor;
    said electrical conductor having at least one outer connecting section with a circular cross section and a contact area for connection to a connection piece of a feed line or said electrical conductor having an inner or outer thread being coaxial to said central axis of said bushing; and
    at least said bushing or said electrical conductor being configured to absorb torques of up to 3.6 Nm (newton meters) per $cm^2$ (square centimeters) of said contact area acting at least on said connecting section or on said inner or outer thread in circumferential direction thereof.

13. The electrical connection according to claim 12, wherein said electrical conductor has securing elements for securing against rotation in vicinity of said bushing.

14. The electrical connection according to claim 12, wherein said electrical conductor has an outer cross section deviating from a circular shape in vicinity of said bushing.

15. The electrical connection according to claim 12, wherein said electrical conductor has an outer structure extending in a longitudinal direction of said electrical conductor or at an angle to said longitudinal direction in vicinity of said bushing.

16. The electrical connection according to claim 12, wherein said bushing has at least a shape or an inner surface structure acting as a mating piece to a corresponding region of said electrical conductor, said bushing is electrically insulated from said corresponding region by said insulating layer, and said insulating layer is ceramic.

17. The electrical connection according to claim 12, wherein said electrical conductor has at least one structure in a longitudinal direction interacting with said bushing as a tongue and groove in vicinity of said bushing.

18. The electrical connection according to claim 12, wherein said electrical conductor has at least one structure extending in a circumferential direction for increasing gas-tightness of said bushing in vicinity of said bushing.

19. The electrical connection according to claim 12, wherein said connecting section has a conical shape configured to be plugged together with a corresponding shape of the connection piece in a self-locking manner.

20. The electrical connection according to claim 19, wherein said outer thread of said electrical conductor is disposed above said conical connecting section and is configured to permit a nut to be screwed onto said outer thread to tighten the connection piece.

21. The electrical connection according to claim 19, wherein said electrical conductor has an inner thread configured to receive a screw for tightening the connection piece.

22. The electrical connection according to claim 12, wherein said electrical conductor has an opposing holding device configured to apply a counter torque.

\* \* \* \* \*